(12) United States Patent
Sigouin

(10) Patent No.: US 8,739,835 B2
(45) Date of Patent: Jun. 3, 2014

(54) FLUID TRANSFER DEVICE HAVING LEAK INDICATION AND METHOD OF MAKING SAME

(75) Inventor: Bradley Joseph Aurel Sigouin, Surrey (CA)

(73) Assignee: Great Lakes Copper Inc., London, Ontario (CA)

( * ) Notice: Subject to any disclaimer, the term of this patent is extended or adjusted under 35 U.S.C. 154(b) by 396 days.

(21) Appl. No.: 12/887,249

(22) Filed: Sep. 21, 2010

(65) Prior Publication Data

US 2011/0120576 A1 May 26, 2011

Related U.S. Application Data

(60) Provisional application No. 61/244,670, filed on Sep. 22, 2009.

(51) Int. Cl.
*F16L 55/00* (2006.01)

(52) U.S. Cl.
USPC .................. 138/104; 138/36; 138/114; 73/40; 73/762; 116/206

(58) Field of Classification Search
USPC ........ 138/104, 36, 127, 138, 114, 109; 73/40, 73/40.5 R, 73–77, 762; 116/206
See application file for complete search history.

(56) References Cited

U.S. PATENT DOCUMENTS

| | | | | |
|---|---|---|---|---|
| 3,721,898 A | * | 3/1973 | Dragoumis et al. | .......... 324/693 |
| 3,911,959 A | * | 10/1975 | Frank | ............................. 138/36 |
| 4,029,889 A | * | 6/1977 | Mizuochi | .................... 174/11 R |
| 4,345,363 A | | 8/1982 | Leuchs et al. | |
| 4,446,892 A | * | 5/1984 | Maxwell | ....................... 138/104 |
| 4,735,083 A | * | 4/1988 | Tenenbaum | ............... 73/40.5 R |
| 5,102,012 A | * | 4/1992 | Foster | ............................ 222/40 |
| 5,228,478 A | * | 7/1993 | Kleisle | .......................... 138/104 |
| 5,244,016 A | | 9/1993 | Kuroda et al. | |
| 5,332,160 A | * | 7/1994 | Ruskin | ......................... 239/542 |
| 5,353,843 A | * | 10/1994 | Hoag | ............................ 138/110 |
| 5,497,809 A | | 3/1996 | Wolf | |
| 5,769,128 A | | 6/1998 | Auvil et al. | |
| 5,868,171 A | | 2/1999 | Karl | |
| 6,135,159 A | | 10/2000 | Karl | |
| 6,328,074 B1 | | 12/2001 | Wright et al. | |
| 6,550,499 B1 | * | 4/2003 | Pai | ................................ 138/104 |
| 6,688,338 B2 | | 2/2004 | Meli et al. | |
| 7,631,666 B1 | * | 12/2009 | Ng et al. | ....................... 138/104 |

(Continued)

FOREIGN PATENT DOCUMENTS

| | | |
|---|---|---|
| BE | 562069 | 11/1957 |
| CA | 2189320 | 5/2004 |

(Continued)

*Primary Examiner* — Patrick F Brinson
(74) *Attorney, Agent, or Firm* — Downs Rachlin Martin PLLC

(57) ABSTRACT

A fluid transfer device and methods and apparatuses for making same is provided. The fluid transfer device comprises a conduit configured to transfer a fluid. The fluid transfer device further comprises a sheath surrounding the perimeter of the conduit and extending along at least part of the length of the conduit. In some embodiments, the interior of the sheath may be grooved to facilitate movement of the fluid from the location or locations of a leak or leaks along the length of the fluid transfer device. The sheath comprises one or more leak detection portions configured to provide an indication of fluid leaking from the conduit.

13 Claims, 12 Drawing Sheets

(56) References Cited

U.S. PATENT DOCUMENTS

| | | | |
|---|---|---|---|
| 8,087,430 B1 * | 1/2012 | Betz et al. | 138/104 |
| 2005/0087250 A1 * | 4/2005 | Ng et al. | 138/127 |
| 2008/0110518 A1 | 5/2008 | Hamilton | |
| 2009/0139596 A1 * | 6/2009 | Kuyl et al. | 138/148 |
| 2010/0089521 A1 * | 4/2010 | Ng et al. | 156/145 |

FOREIGN PATENT DOCUMENTS

| | | |
|---|---|---|
| EP | 0029874 | 6/1981 |
| EP | 0145831 | 6/1985 |
| FR | 2220740 | 10/1974 |
| GB | 1305999 | 2/1973 |
| GB | 1475860 | 6/1977 |
| GB | 1547128 | 6/1979 |
| GB | 2097416 | 11/1982 |
| JP | 54086817 | 7/1979 |
| JP | 01176884 | 7/1989 |
| JP | 2006284511 | 10/2006 |
| JP | 2008256015 | 10/2008 |
| WO | 0107856 | 2/2001 |
| WO | 2005120805 | 12/2005 |

* cited by examiner

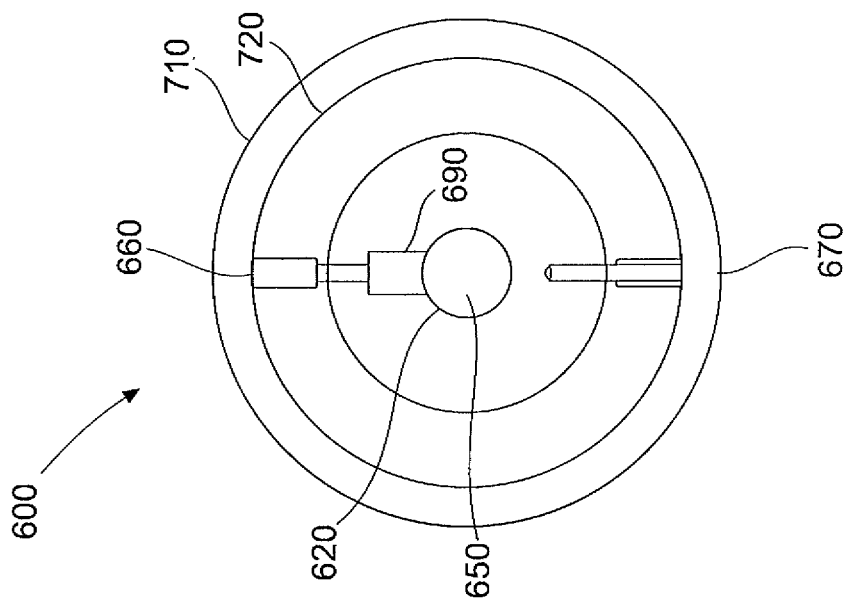
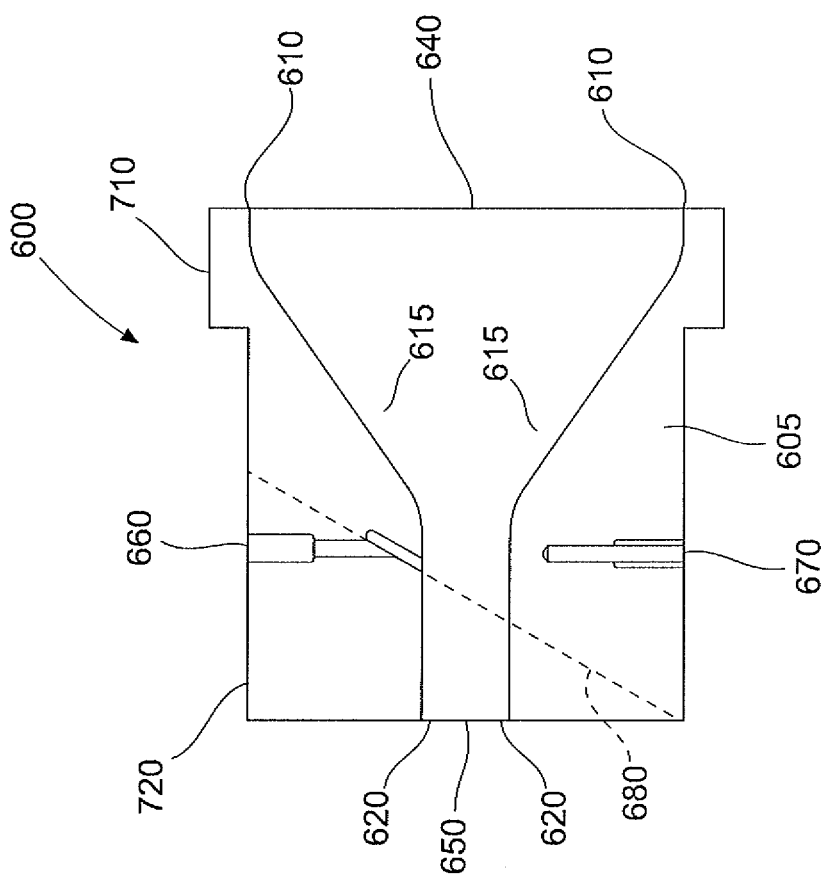

FLUID TRANSFER DEVICE HAVING LEAK INDICATION AND METHOD OF MAKING SAME

CROSS-REFERENCE TO RELATED APPLICATION

The present application claims priority to U.S. Provisional Patent Application No. 61/244,670 filed Sep. 22, 2009, the contents which are hereby incorporated by reference in their entireties.

FIELD OF THE INVENTION

The present invention pertains to field of fluid transfer devices, and fluid detection devices with leak detection. The present invention also pertains to field of use and manufacturing of fluid detection devices.

BACKGROUND

Within the heating oil industry, for example, due to the flexibility and ease of installation, copper tube has become the product of choice for conveying heating oil to homes or commercial installations. Because of the adverse conditions the tubing may be exposed to in some applications, on-site sleeving or factory coated copper has now become the industry norm in most areas. The tubing is often found in basements where it may be exposed to concrete or in corrosive soil conditions. Because of oil contamination, difficulty of clean up and/or use in areas where pipes and tubes are not always accessible along their entire length, there are concerns relating to undetected failures. In addition, some jurisdictions require an annular space or air cavity for assistance in leak detection. Similar conditions and issues are also experienced in other types of piping and tubing applications, including water pipes, natural gas lines, high and low pressure gas lines, or other fluid transfer conduits that would be known to a person skilled in the art.

Sleeves for tubes and pipes that are used for protecting same from external conditions and for containing leaks have generally been coupled to pipes or tubes on-site. Coated copper tubes, using both grooved and smooth inner surfaces, have been manufactured but may not meet certain code conditions relating to tubing type and use identification. Should the inner copper tube get fractured, or through corrosion develop a leak, the contents (for example, red heating oil) will leak out into the space between the sleeve and the tube. In some locations, not all parts of a tube or pipe are capable of being visually inspected because, for example, they are behind walls or other objects, underground, or otherwise difficult to access.

Therefore, there is a need for a new fluid transfer device that enables detection of leaks while overcoming at least one of the problems identified in the art.

This background information is provided to reveal information believed by the Applicant to be of possible relevance to the present invention. No admission is necessarily intended, nor should be construed, that any of the preceding information constitutes prior art against the present invention.

SUMMARY OF THE INVENTION

An object of the present invention is to provide a fluid transfer device having visual indication, and a method of making same. In accordance with an aspect of the present invention, there is provided a fluid transfer device comprising a conduit configured to transfer a fluid, said conduit having a perimeter and a length; and a sheath surrounding the perimeter of the conduit and extending along at least part of the length of the conduit, the sheath including one or more leak detection portions, each leak detection portion configured to provide an indication of fluid leaking from the conduit.

In accordance with another aspect of the present invention, there is provided an apparatus for making a fluid transfer device comprising an extrusion die for receiving a conduit in a first transverse bore, said first transverse bore extending through the extrusion die from an conduit receiving location to a conduit exit location; one or more extrusion material inlets for receiving one or more extrusion materials; and one or more extrusion material outlets in fluid communication with the one or more extrusion material inlets and located substantially near the conduit exit location, the one or more extrusion material outlets configured to extrude the one or more extrusion materials around the conduit as it passes through the transverse bore.

In accordance with another aspect of the present invention, there is provided a method for making a fluid transfer device comprising the steps of receiving a conduit through a die at a first pre-determined rate; receiving one or more extrusion materials in the die at one or more extrusion material inlets at a second pre-determined rate, the one or more extrusion material inlets in fluid communication with one or more extrusion material outlets, the one or more extrusion material outlets configured to apply the one or more extrusion materials around a perimeter of the conduit in a pre-determined geometry as the conduit transfers through the die.

In accordance with another aspect of the present invention, there is provided a use of the fluid transfer device for leak detection, leak containment, leak diversion, or any combination thereof.

Other objects, advantages and features of the present invention will become more apparent upon reading of the following non-restrictive description of illustrative embodiments thereof, given by way of example only with reference to the accompanying drawings.

BRIEF DESCRIPTION OF THE FIGURES

FIG. 6 depicts a cross-sectional side view of an exemplary device for manufacturing a fluid transfer device in accordance with an embodiment of the instant invention.

FIG. 7 depicts a cross-sectional front view of an exemplary device for manufacturing a fluid transfer device in accordance with another embodiment of the instant invention.

DETAILED DESCRIPTION OF THE INVENTION

Definitions

Figure 1:
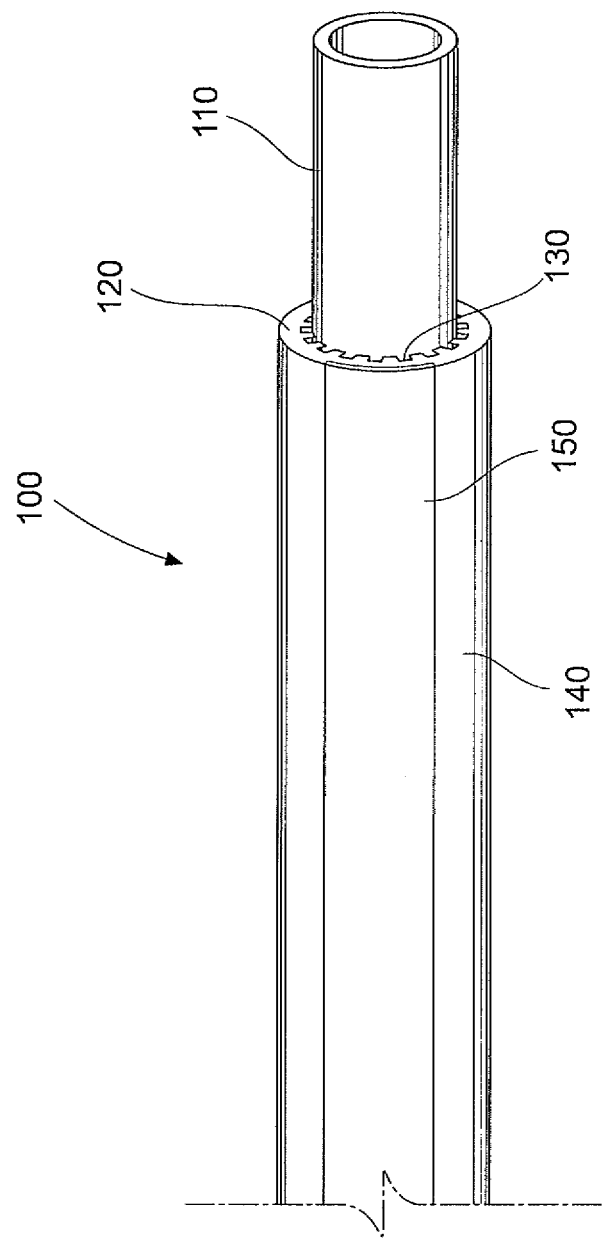
FIG. 1 depicts a representative breakaway diagram of a portion of a fluid transfer device in accordance with one embodiment of the instant invention.

The term "fluid" as used herein refers to any material contained in and conveyed by the conduit. The term fluid is generally understood to refer to any material that deforms when a shear stress is applied. While fluid generally would refer to any liquids or gases, it may be used herein to describe fluidized solids and bulk solids that are capable of "flowing" or otherwise moving inside a conduit as a result of pressure differences and/or applied force. Such materials may include slurries, suspensions, pastes, powders, granular solids, particle solids, or combinations thereof. Bulk solids can be referred to as a fluid herein provided the bulk solids are capable of being conveyed in a conduit, which may depend on properties and characteristics of the bulk solids and/or conduit.

The term "leak" as used herein, refers to an opening, for example a crack, fracture, hole or other opening, intended or unintended, in a conduit or other fluid-containing system, such as a tank or vessel, through which the contents of the conduit can escape or outside matter can enter the conduit. The term may be used herein as a verb; matter going through the opening is said to leak. As used herein, the entry, exit, or exchange of matter through the leak may be referred to as leakage. The matter leaking in or out can be any fluid in the conduit or surrounding same. A leak can be between two (or more) fluid-containing systems, allowing transfer of fluid from either system to the other, or even an exchange of fluid between them. Leakage of fluid or other matter into a conduit or other system could be called inleakage. Leakage of fluid out of a conduit or other system could be called outleakage. As would be understood by a person skilled in the art, terms that may be used to refer to a leak may include, but would not be limited to, the following verbs: break, discharge, drip, drool, escape, exude, ooze, spill, trickle; and the following nouns: opening, aperture, chink, crack, crevice, destruction, detriment, drip, drop, escape, expenditure, exposure, fissure, flow, hole, loss, percolation, pit, puncture.

The term "visual indication" as used herein, refers to direct or indirect indication of an event or the existence or presence of matter that is detectable by a light detection element, such as a human or machine eye, or other automated means for detecting a change in light and/or colour or other visual characteristics. A visual indication that is direct may be a visual detection of the event or of the matter. A visual indication that is indirect may include any apparatus, device, material, reaction, or detection that effects a change in some other thing upon the occurrence of an event or presence of matter, and which change is detectable by a light detection element, such as a human or machine eye, or other automated means for detecting a change in light and/or colour or other visual characteristics. It may also include an opening at a pre-determined location on the sheath allowing the presence of matter inside the sheath to be visually identified; such openings may include a fissure, window, strip, or other hole, including openings at the end of the sheath or conduit. An example of an indirect visual indication may include a change in colour or luminescence, possibly by way of a chemical, physical or electrical reaction, in a material of or in the sheath or conduit, or in some related or associated device or apparatus, in response to the presence of a certain material or the occurrence of an event. An indirect visual indication may include an indication or indicator that is visible to the eye, whereby said indication or indicator changes visibly upon the occurrence of a specified event or the presence of a specified material.

The term "clear" as used herein, may include translucent, semi-translucent, transparent, semi-transparent, or other format that allows the transmission of at least some light. It may be used herein to describe any material that permits the transmission of light therethrough. In some embodiments, the material need only be sufficiently clear to determine the existence of leaked fluid between the conduit and the sheath and may therefore include a material ranging from completely clear to almost opaque, may be referred to herein as clear. Sufficiently clear material may include material that permits the transmission of light that may be diffuse, such that there is no perception of distinct images, or non-diffuse.

The term "extrusion" as used to herein, refers to process in which material is forced through an orifice or die, or series of orifices or dies. In general, material is forced through an orifice with a particular cross section (typically, a die), and a continuous shape is formed with a constant cross section similar to that of the orifice(s) or die(s). In some extrusion processes, the extruded material is continuously forced through an orifice or die, resulting in shapes such as cylindrical or oval rods and pipes, rectangular solid and hollow bars, and long plates, or any other shapes that can be created by using a die. In some cases, extruded material is forced through an orifice or die with additional non-extruded material resulting in a composite material comprising both the extruded and the non-extruded material. An example of such a process would be forcing a metal pipe through an extruder along with a polymer-based material in order to coat the exterior of the pipe, and/or fill at least a portion of the interior void, with the extruded material in a way that the resulting composite product has a constant cross-section with respect to the extruded material. Typically, extrusion may be used with metals, plastics, polymers, or ceramics, although other materials may be used as would be understood by a person skilled in the art. Types of extrusion include, but are not intended herein to be limited to, hot extrusion, cold extrusion, warm extrusion, direct extrusion, indirect extrusion and hydrostatic extrusion. Drive types include, but are not limited to, hydraulic (water and oil), mechanical presses and screw-type drives.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

General Overview

Embodiments of the instant invention generally comprise of a conduit and a sheath that (a) provide leak detection capabilities by covering, containing and/or preventing leakage, and/or diverting the leakage from the leak location to a location where the existence of leaked fluid may be detected; and/or (b) facilitating the leaked substance to travel along the outside surface of the conduit to the end of the sheath or some intermediate location; and/or (c) provide a leak detection portion, which in some embodiments remains compatible with local fluid transfer device marking conventions or requirements. Other embodiments of the instant invention include methods of manufacturing fluid transfer devices, which provide for various indicia or markings, including use or fluid transfer device identifiers, including those used by regulatory or standards bodies (e.g., UC, UCL, etc.). Embodiments of the present invention may be used for diagnostic purposes to detect and/or localize leaks, and/or for providing visual confirmation of conduit integrity when there is no leak.

In general, there is disclosed herein a fluid transfer device and methods, systems and apparatuses for making same. The fluid transfer device comprises a conduit configured to transfer a fluid from one location to another, said conduit having a perimeter and a length. The conduit may in some embodiments be a discrete element, such as a single length of tubing, pipe or hose, or it may comprise in some embodiments a number of elements and sub-elements, including elements for attaching, splitting or combining conduits, and elements for measuring or changing characteristics of the fluid, such as, but not limited to, valves, pressure/temperature sensors and transducers, pumps, and hammer stops. The fluid transfer device further comprises a sheath surrounding the perimeter of the conduit and extending along at least part of the length of the conduit. In some embodiments, the interior of the sheath and/or the exterior of the conduit may be grooved to facilitate movement of the fluid from the location or locations of a leak or leaks along at least a portion of the length of the fluid transfer device. The sheath also comprises one or more leak detection portions, each leak detection portion configured to provide a visual indication on the sheath, said visual indication indicative of fluid leaking from the conduit. Optionally, the sheath and/or conduit may also include in some embodiments identifying portions and/or other leak detection elements which may be added to the conduit before the sheath is applied, or it may be applied to or impregnated in the sheath material.

Optionally, the sheath also includes an identifying portion which may be added to the sheath material during a co-extrusion process. The co-extrusion process may cause the sheath to comprise an additional portion that allows the fluid transfer device to be identified according to a colour that may relate to a particular use, fluid type, leak detection capabilities, and/or acceptable conditions for use. The identifying portion may to relate to regulatory or code requirements. In some embodiments, it may be desirable to make a sheath with such an identifying portion in order to have a leak detection portion while maintaining a recognizable colour or other indicia on a fluid transfer device. In some embodiments, identification marks may be printed onto the sheath or conduit.

In some embodiments, the fluid transfer device comprises a leak detection element. The leak detection element may be applied, or otherwise located proximal to the exterior surface of the conduit and/or the interior surface of the sheath. The lead detection element is configured to change in one or more visual characteristics upon contact with fluid leaked from the conduit. One or more of the leak detection portions of the fluid transfer device of such embodiments are configured to detect a change in visual characteristics of the leak detection element. A leak detection element may include a strip, coating or other covering that is applied to the conduit prior to the application of the sheath. Alternatively, the leak detection element may be applied to the interior of the sheath. Various characteristics of the leaked fluid can be used to induce a visible change in the leak detection element, including pH, wetness, chemical reaction, or change in temperature. Other characteristics of the fluid may be used to induce a visible change as would be known by a person skilled in the art.

With reference to FIG. 1, there is disclosed herein a fluid transfer device 100 according to embodiments of the instant invention, the fluid transfer device configured to transmit fluid in an inner conduit 110, and the fluid transfer device further comprising a sheath 120, which in this embodiment has one or more grooves 130 along the interior surface of the sheath. In other embodiments, the interior of the surface of the sheath may be non-grooved, or a combination thereof, along at least a portion of the fluid transfer device. The sheath 120, in some embodiments, comprises one or more portions 140 along the length of the device, or at one or more locations on or along the device, that are made of transparent material allowing persons to view an interior portion of the sheath 120 that is exterior of the conduit 110. Alternatively, the portions 140 comprise of material that otherwise provide a means for visual detection of fluid inside the sheath 120 and outside the inner conduit 110, such as, for example by the sheath 120 or a leak detection element proximal to the conduit changing colour or luminescence upon contact with fluid which may leak from the conduit 110. In some embodiments, an additive may be impregnated into or applied to the surfaces of the sheath 120 or outer surface of the conduit 110 that is capable of changing colour, luminescence or some other visual characteristic upon contact with leaked fluid. The sheath 120 can be grooved or smooth, close-fitting or non-close-fitting to the inner conduit 110. If the fitting is non-close, the sheath may be coupled to the conduit by frictional, adhesive, or other type of engagement means to prevent the sheath from sliding along the conduit, while potentially allowing fluid to travel between the sheath 120 and the conduit 110. The sheath 120 can also be closed at the ends of the conduit or open. In embodiments in which the sheath is open at the ends, the pressure difference between ambient conditions and that inside the conduit may facilitate fluid that has leaked from the conduit to move along the inside of the sheath to a leak detection portion or an accessible location having a leak detection portion.

Also with reference to FIG. 1, the device 100 comprises in some embodiments an inner conduit 110 used to transfer or convey a fluid, and an outer sheath 120. The sheath 120 may in some embodiments be comprised of a polymer and/or a clear resin that is co-extruded with inner channels for leak detection and an additional identifying portion 150 with or having line marking and certification requirements for industry code issues. There may be instances where the sheath, or a portion thereof, may not have the inner grooves 130 and therefore extruded using a smooth die and/or pin therein to meet the required field conditions.

The fluid transfer device may comprise in some embodiments one or more leak detection portions at which a visual determination can be made as to the presence of the fluid between the conduit and the sheath, thus indicating the existence of a leak in the conduit. In some embodiments, the entire length of the device may comprise a leak detection portion, such as a continuous or intermittent clear sheath material or a strip of continuous or intermittent clear sheath material. In other embodiments, transfer of fluid along the sheath/conduit interface to a different location may be desired due to accessibility of portions of the device and/or the one or more leak detection portions, or sections thereof. An example of this may include when the device is partially buried or located behind a wall or other objects, fluid can be transferred inside the sheath and outside the conduit from the location of the leak or leaks to a location where a the device is easily accessible. In other embodiments, the opening of the sheath at a predetermined location, such as at the end of a length of tubing that is accessible to a person carrying out inspection, may serve as the leak detection portion. A cap may be provided for affixing to an end of a length of tubing, the cap configured to collect fluid and provide visual indication of leaks.

Other embodiments of the instant invention include a method of manufacturing the device. The method comprises the steps of directing a conduit through a first bore in a die; directing a primary extruding material through one or more fluid inlets of the die such that that the first extruding material is forced out of the die surrounding the conduit in the form of a sheath and with a substantially constant cross-section. In some embodiments, the primary extruding material may be: entirely comprised of a material that is transparent when it has formed the sheath around the conduit; comprised only a portion of transparent material, such that only one side or strip of the sheath is transparent; comprised of alternating transparent and non-transparent material thus forming "rings," "windows," or sections of transparency surrounding the perimeter of the conduit; or a combination thereof.

Figure 8:
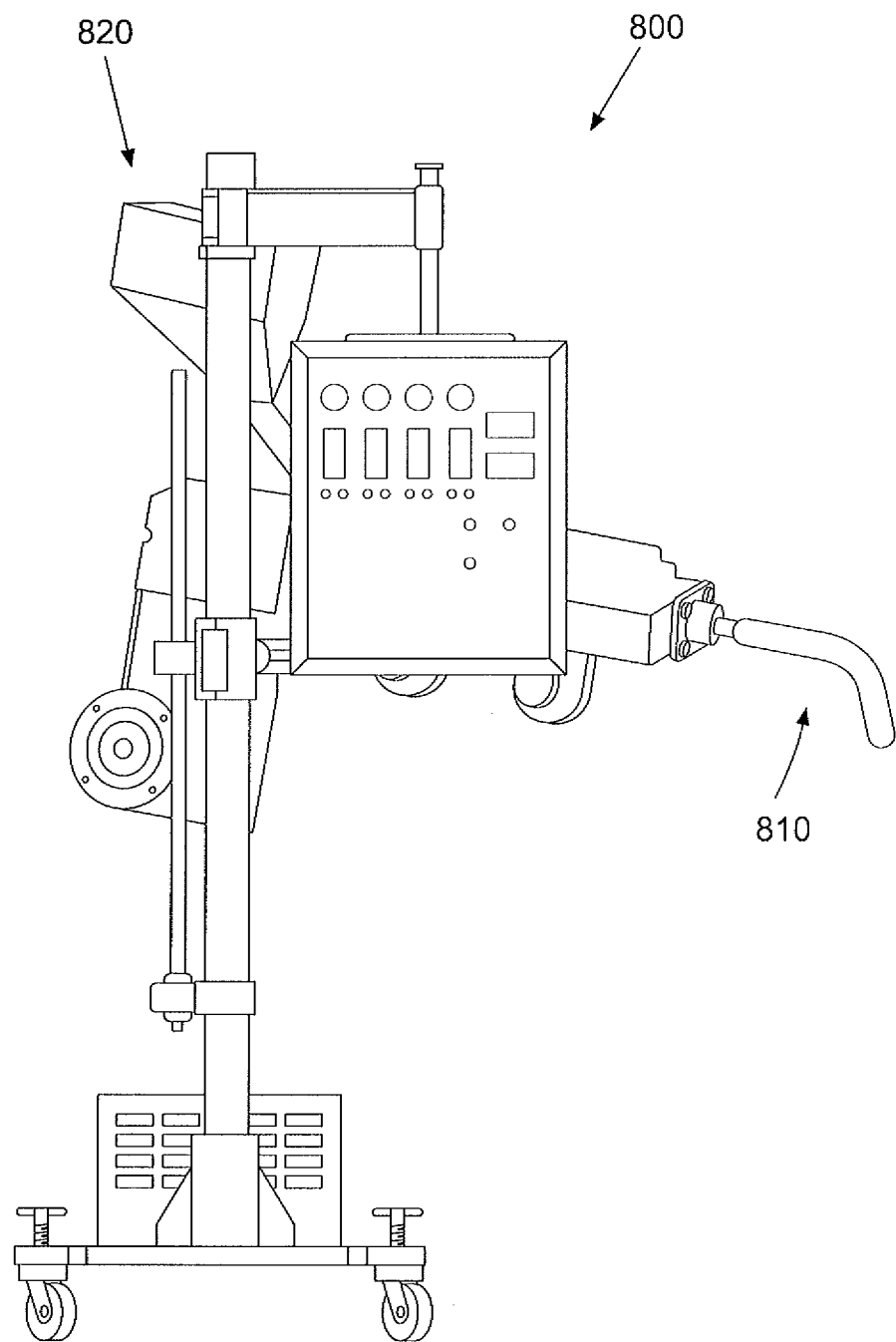
FIG. 8 depicts an extrusion device capable of being used as part of a system for the manufacturing of a fluid transfer device in accordance with another embodiment of the instant invention.
Figure 9:
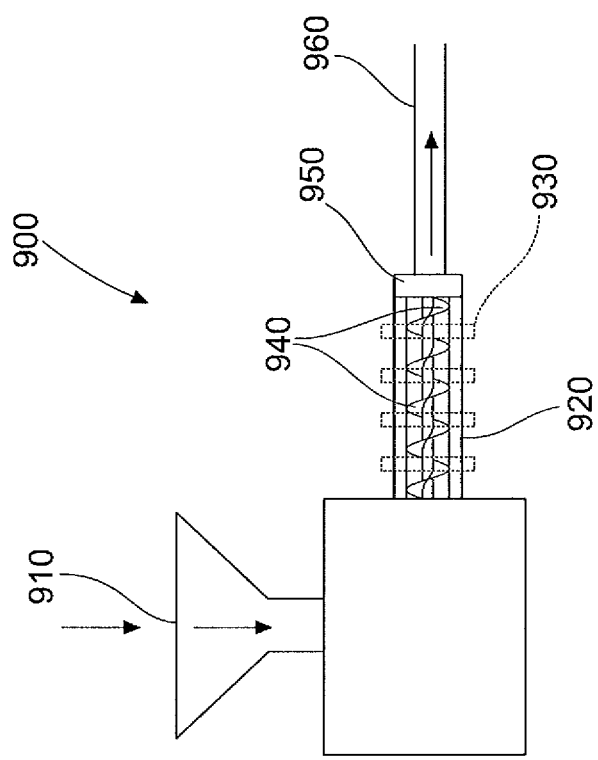
FIG. 9 depicts an extrusion device capable of being used as part of a system for the manufacturing of a fluid transfer device in accordance with another embodiment of the instant invention.

Optionally, in some embodiments, there may be one or more additional extruding materials pushed into the die via one or more supplemental material inlets by a co-extruding device (such as the ones depicted in FIG. 8 or 9). The resulting sheath in such embodiments would be formed by co-extrusion and have distinct sections in a cross section. The additional sections may comprise in some embodiments the leak detection portion (for example, a clear strip), or in other embodiments the opposite configuration (i.e., a non-clear strip on a substantially clear sheath). Alternatively, the additional extruding materials may define a portion of the sheath that could be comprised of a colour that has been pre-determined to identify the nature, use, or other characteristic of the device, or is otherwise capable of being used in such a way by, for example, being capable of having information written or otherwise included thereupon. The additional extruding materials may be applied along the surface of the sheath, or form a portion of the radial distance from the inner surface of the sheath to outer surface. In some embodiments, the additional materials form no more than 50% of the radial thickness of the sheath so that the primary extruding material is not weakened in the location where the additional extruding material is applied to the sheath.

Another embodiment of the instant invention comprises use of a fluid transfer device specifically adapted for transferring a particular fluid, such as, for example, heating oil, natural gas, water, bulk or fluidized solids, powdered or granulated solids, slurries, suspensions, gases, liquids, or other fluid known in the art. In some embodiments, the use of the device is directed to, or includes, leak containment by the sheath and/or leak diversion from the location of the leak in the conduit to another location where, for example, the leaked fluid can be managed safely or otherwise detected.

Another embodiment of the instant invention comprises a sheath for a fluid transfer device that surrounds the perimeter of the device and extends along at least part of the length of the device, the sheath including one or more leak detection portions, each leak detection portion configured to provide a visual indication on the sheath, said visual indication indicative of fluid leaking from the conduit. The sheath is in some embodiments formed by extruding the material, or co-extruding multiple materials, comprising the sheath through a die as the conduit is also passed through the die or a pin and die arrangement. Reference to a die herein includes dies which comprise a pin and die arrangement. In some embodiments, the sheath includes one or more leak detection portions which may be formed by using a material that is transparent upon being formed around the conduit. In other embodiments, the material includes an additive that is reactive to the fluid being transferred in the conduit such that contact by the fluid to the sheath induces a change in colour or some other visual characteristic. In some embodiments, a reactive material may be provided as a powder, coating, or sticker, or the like, applied at one or more locations between the conduit and the sheath, and the sheath may include transparent portions overtop of the reactive material for facilitating leak detection. Reactive materials may be configured to react to the presence of one or more different fluid types. In some embodiments, reactive materials or combinations of reactive materials may be configured to react to different fluid types in different ways, for example by changing to different colours. Types of reactive materials, such as chemically reactive materials, that react to predetermined fluids such as heating oil or gas, for example to produce a colour change, would be readily understood by a worker skilled in the art.

In some embodiments, by placing a transparent (i.e., clear, translucent, or partially clear) sheath, or alternatively a sheath whose properties are altered by contact with the fluid being transferred through the conduit, leak detection can be simplified, or a combination of a sheath having clear portions and being visible therethrough one or more leak detection elements, such as a strip, sleeve, coating or covering whose properties are altered by contact with the fluid being transferred through the conduit. The presence of a leak can be detected by visual inspection, either by directly observing if there is any fluid outside of the conduit and within the sheath through a transparent portion (such as a clear or translucent strip or window) or indirectly when the fluid induces some change or event when the fluid is located between the conduit and the sheath. Examples of means for inducing a visual change include a reaction whereby contact between the fluid and the leak detection portion, or between a fluid and a leak detection element that is detectable at the leak detection portion, induces a change in the colour or other visual characteristics of the sheath or leak detection element, including for example, an electrical change (such as by the fluid completing or shorting a circuit), a change in pH, a change in chemical composition that induces a chemical reaction, a change in wetness, or other change that creates a visual signal or induces same in an additional component (e.g., a light).

In some embodiments, the sheath comprises one or more inner grooves along the entire length of the sheath, or along portion or portions thereof. The inner grooves may facilitate that transfer of fluid along the length of the tube (or a portion thereof). In some embodiments, the sheath is smooth around the conduit and in such cases the movement of fluid along the interface between the outer surface of the conduit and the inner surface of the sheath may be facilitated by pressure differences, surface tension, capillary forces, and/or other mechanical or physical means. In yet other embodiments, the morphology of the interior surface of the sheath may include additional features intended to facilitate or impede the transfer of leaked fluid from one location along the device to another location along the device, and may include tapered extensions, baffles, threading, or other structure or feature that would be known to a person skilled in the art.

In some embodiments, one or more channels are provided between the sheath and the conduit, for example by providing grooves in the sheath and/or conduit. The channels are configured to provide fluid communication between potential leak sites of the conduit and one or more leak detection portions. The channels may be substantially straight, spiral-shaped, meandering, or the like. In some embodiments, channels may be provided by providing bumps between the sheath and the conduit, for example protruding from the sheath inner layer, of by providing beads or other material between the sheath and the conduit to make a network of spaces therebetween.

In some embodiments, the one or more channels may be configured, for example in shape, cross-sectional area, and the like, for conveying fluid having characteristics within a predetermined range. For example, the cross-sectional area of a channel may be sized to facilitate flow of the fluid from a leak site of the conduit to a leak detection portion, under a predetermined range of conditions affecting fluid flow. Conditions affecting fluid flow may include: viscosity of the fluid, temperature of the fluid, which may also affect viscosity, pressure applied to the fluid in the channel, and the like. In some embodiments, the fluid transfer device may be configured for operation within a particular range of conditions affecting fluid flow. In some embodiments, the fluid transfer device may be marked to indicate its operational characteristics in this regard. In some embodiments, channels may be made of a material that resists degradation when exposed to a predetermined type of fluid and/or facilitates flow of one or more predetermined types of fluids.

In some embodiments, one or more leak detection portions may be configured to provide visual indication of a leak occurring in a predetermined portion of the conduit. For example, a leak detection portion may be provided in fluid communication with one or more channels established along the predetermined portion of the conduit to convey fluid from said predetermined portion to the leak detection portion. Different leak detection portions may provide visual indications of leaks in different portions of the conduit, thereby facilitating leak localization.

Figure 2:
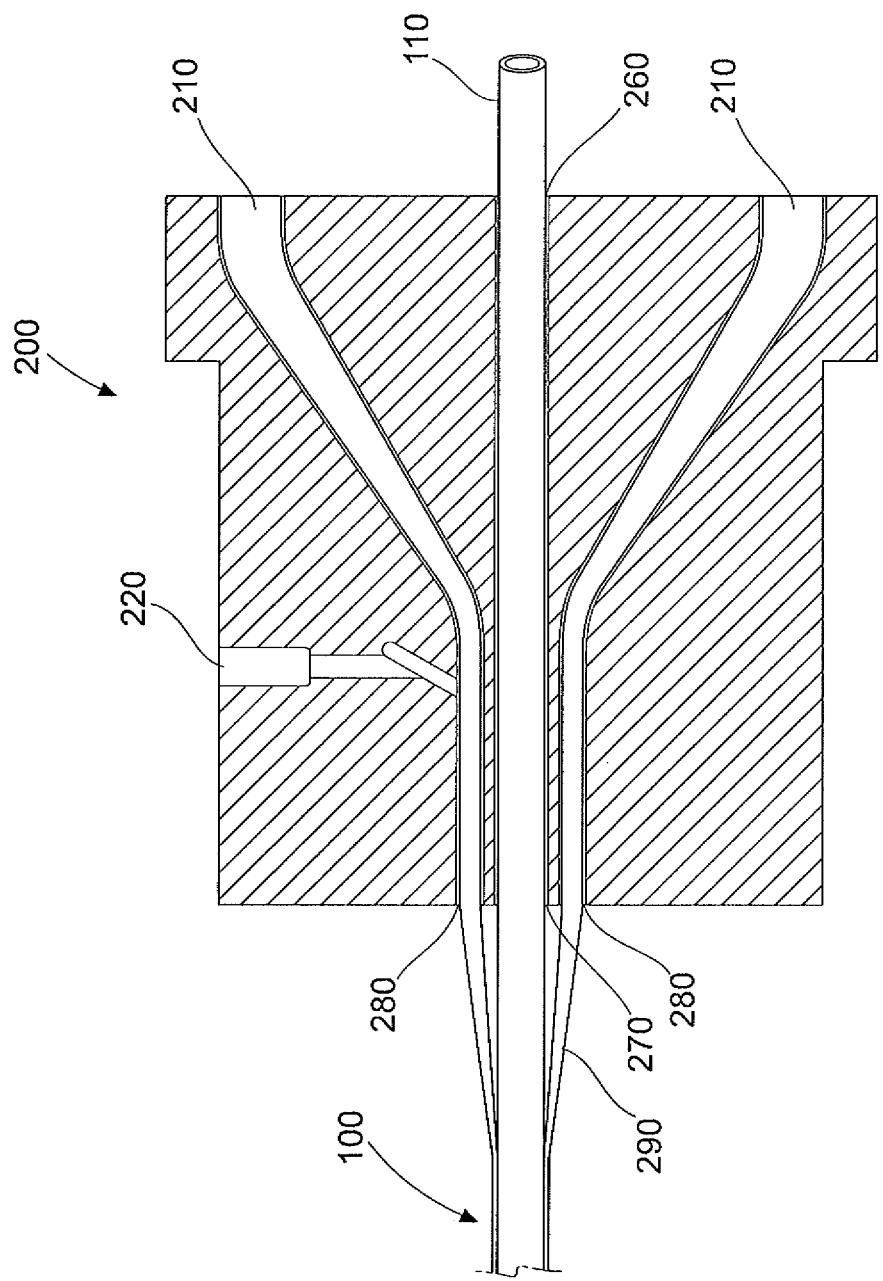
FIG. 2 depicts a cross sectional view of an apparatus for manufacturing a fluid transfer device in accordance with embodiments of the instant invention.

FIG. 2 illustrates in cross-section a co-extruding apparatus 200 for making a fluid transfer device 100 by applying a sheath by extrusion onto a conduit 110 according to embodiments of the instant invention. The apparatus 200 comprises a conduit inlet 260 for a receiving a conduit 110 and a conduit outlet 270, where the conduit passes from the apparatus 200. The apparatus 200 may be adapted to receive the conduit 100 at different speeds. The apparatus 200 further comprises one or more first inlets 210 for a first extruding material, and outlets 280 that extrude the first extruding material 290 around the conduit 100 as it leaves the apparatus. The flow rate of the extruding material relative to the speed of the conduit 100 through the apparatus 200 will, in part, determine the thickness of the sheath. The apparatus optionally comprises one or more additional inlets 220 that provide for co-extrusion of additional materials onto the conduit 100 or onto the sheath, or some combination thereof. In some embodiments, a co-extruder 800, such as the one shown in FIG. 8, may be secured via an extruder outlet 810 to the one or more additional inlets 220. The additional materials may form the entire thickness of the sheath around one or more portions of the perimeter of the device, or the additional material may form a layer on the outer surface of the sheath. In one example of the instant invention, an additional inlet 220 is configured to apply a strip of coloured material to an outer side of the sheath and form no more than 50% of the distance from the inner surface of the sheath to the outer surface of the sheath.

Figure 3:
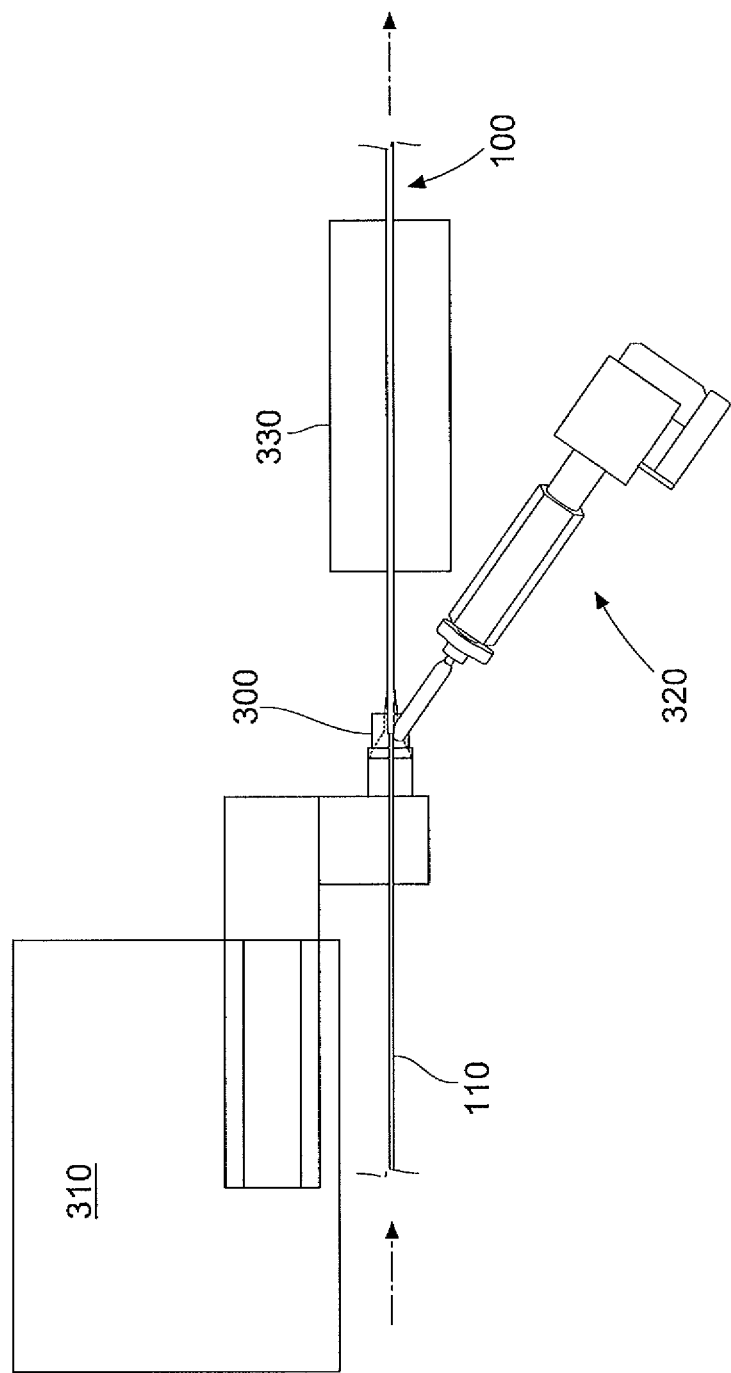
FIG. 3 depicts a diagram representative of a system for manufacturing a fluid transfer device in accordance with embodiments of the instant invention.

With reference to FIG. 3, there is illustrated a system for manufacturing a fluid transfer device 100 according to embodiments of the instant invention. The system comprises a co-extrusion device 300, sometimes referred to as an extrusion tooling (in other embodiments wherein there is no secondary co-extruder, the device 300 may also be referred to as an extrusion device), a primary extruder 310, a secondary extruder 320, and a cooling element 330. The co-extruding device is configured to accept a conduit 110 at a pre-determined rate of speed, primary extruding material from the primary extruder 310, and optionally a secondary extruding material from the secondary extruder 320. The extruding material(s) from the primary and secondary extruders 310, 320 is forced through a die in the co-extrusion device 300 such that it surrounds the perimeter of the conduit 100 as it passes from the device 300. The fluid transfer device 100 then optionally passes through a secondary functional element 330 which may perform one or more of the following functions: cool the fluid transfer device, cure and/or harden the sheath material, apply identification markings to sheath, apply additives to the sheath surface, or cut openings in the sheath, or insert objects or devices into the sheath.

The invention comprises in some embodiments uses of a fluid transfer device with visual leak detection. In some embodiments of such a system, there are different modes of leak detection. A first mode of leak detection would result in the transfer of fluid along inner grooves of the sheath to an open end of the sheath and/or to a leak detection portion. A further mode of leak detection would maintain the visual leak detection at a leak detection portion when the ends of the sheath may be sealed. In embodiments wherein the sheath has sealed sheath ends, there may be little or no fluid transfer along the fluid transfer device between the conduit and sheath and in such cases the one or more leak detection portions may be found along the entire length of the device or at frequent discrete locations along the length of the device. In other embodiments, surface tension of the fluid, capillary action, induced pressure differences, or other mechanical means for inducing fluid movement along the fluid transfer device between the conduit and the sheath may be used in order to transfer the fluid from the leak location to the leak detection portion. Since it is a normal practice to have a person doing periodic maintenance on an oil heating system, such as for example, cleaning and or changing a filter, the exposed tubing for can be inspected for a visual indication of a leak in the conduit. In some embodiments, one or more rigid or resilient reservoirs may be provided to accumulate fluid to facilitate leak detection.

In some embodiments, there may be sheaths that comprise additives or other materials that will change colour if exposed to fluid which has leaked from the conduit, including a leak detection element located between the outer surface of the conduit and inner surface of the sheath. One example includes a fluid transfer device wherein the exterior of the outer sheath turns purple in colour when adequately exposed to fluid that has leaked from the conduit. Other visual indications may be possible, including chemical reactions occurring on or in the sheath that induce a change in some visual characteristic of the device, such as size, shape, colour, or the presence of some third material or phase (i.e., gases or bubbles).

The device is intended to be capable of being used to transfer various types of fluid under various conditions, and it may be specifically adapted to transfer a particular type of fluid under particular conditions. The fluid may comprise oil, heating oil, natural gas, water, or other fluid. The device may be adapted for use with a variety of different fluid and/or ambient conditions, such as temperature, pressure, phase, corrosiveness or changes thereof.

Some embodiments of the fluid transfer device may include an identifying portion on the sheath that may be used, as an example, for one or more of the following: to identify the nature and purpose of the device, to identify the fluid contained therein, to identify characteristics of the fluid contained therein, to meet regulatory and/or coding requirements for identifying conduits, or the like as may be required by regulatory or standards bodies (e.g., UC, ULC, etc.). The identification strips may also be used to provide written information relating to the manufacture and/or manufacturer of the device (such as, for example, sizing, materials, methods of cutting and joining and trade names or marks).

The fluid transfer device may be further configured such that the sheath is sealed or unsealed at an end of the conduit, or at a portion thereof. In some embodiments where the sheath is not sealed, fluid leaked from the conduit is permitted to more easily travel from the leak along a portion of the device, assisted for example by gravity, fluid pressure, or the like, or a combination thereof.

Conduit

Generally speaking, the conduit of the instant invention may be a substantially elongated hollow object used to store or convey fluid, and comprises one or more openings at predetermined locations that provide for the ingress or egress of the fluid. In general, a conduit has two or more openings where fluid is intended to enter and/or leave the conduit, at least one of which is for fluid entry and at least one of which is for fluid exiting, as well as a wall-structure intended to form an enclosure around fluid inside the conduit that typically serves to contain the fluid, whether the fluid is stationary therein or travelling between locations. A conduit may include, but is not limited to, flexible or rigid pipes, tubes, hoses, cannuli, chutes, cylinders, ducts, pipelines, pipettes, straws, canals, corridors, lines, sewers and sewer pipes, or a combination or network thereof. A given conduit may be used at times for storing fluid, and at other times from conveying material from one location to another.

The cross-sectional shape of a conduit may be any shape, including cylindrical, oval, square, rectangular, or a combination thereof. In some embodiments, the shape may be selected to facilitate desired flow characteristics of the fluid. For example, the shape may be selected to facilitate desired flow characteristics or conditions of a particular type of fluid under particular conditions, such as viscosity, temperature, volume and pressure ranges. The inner and/or outer surfaces of the enclosing structure, or wall, of the conduit may be flat or smooth, grooved, threaded, baffled, or irregularly shaped.

In some embodiments, the conduit material generally consists of a semi-rigid or rigid piping material, including copper or a copper alloy base and can be manufactured to particular standards, for example ASTM standards. Alternative materials such as aluminium or other metal products may be required if copper or copper alloy base products are effected by the field conditions. Typical outside diameters of conduits in some embodiments range from 3/8"OD to 2"OD depending on the load demand and installation requirements, but may be smaller or greater depending on requirements.

In general, a conduit may also be formed of substantially any material known in the art to be suitable for conduits, including, but not limited to, copper, steel, lead, or other metal, polyurethane, polyethylene, or other polymer-based material, or any composite material, provided that the conduit material is suitable for transferring the intended fluid. In general the material is intended to be more or less capable of containing a desired fluid within the hollow portion of the conduit for a certain amount of residence time and/or distance (when used to convey fluid from one location to another), at required operating conditions, such as pressure, temperature, corrosivity. A conduit may be rigid, semi-rigid, flexible, or a combination thereof.

In some embodiments, a conduit may comprise a section of conduit that connects two locations, or it may comprise multiple sections of conduit and a connective or other attendant devices or units that a fluid travelling in the sections of conduit may contact (e.g., connectors, valves, pumps, impellers, splitters, combiners, etc.). In embodiments that comprise a number of elements, the sheath may or may not surround each discrete section, but may surround one or more of the elements that make up the conduit as a whole. Accordingly, a conduit, as referred to herein, may comprise multiple inlets and outlets and having a number of elements therein.

A conduit may be characterized by its dimensions, such as internal dimensions (e.g., width, height, diameter, cross-sectional area, volume), external dimensions (e.g., width, height, diameter, area), or wall thickness, but may be also be characterized by combinations thereof, including industry standards and methods known in the art such as Nominal Pipe Size. Conduits may be characterized by tolerances to various conditions, such as, but not limited to, pressure, external/ambient or interior/fluid temperature or differences therebetween, flowrate, resistance to corrosion from ambient or internal conditions/fluids. Conduits may be unidirectional (i.e., intended to convey materials from one location to another) or multidirectional. Conduits may also be characterized by the dimensions and means used for connection to other conduits or other elements (e.g., valves, bends, mechanical/fluidic devices like pumps, or measuring devices), including flaring, brazing, mechanical compression, threaded, glued, soldered or other descriptors known in the art such as National Pipe Thread Tapered Thread, National Pipe Thread Tapered Fine, Dryseal American National Standard Taper Pipe Thread. Conduits may also be characterized by the type of fluid that is transferred therein; including, for example, water pipes and/or hoses, oil pipes, gas lines, heating oil tubes, gas pipelines, natural gas conduits, and other types of conduits for transferring fluids known in the art.

In some embodiments, the conduit is formed of copper, aluminum, lead, steel, tin, or any other metal, metal alloy, or composite metal (e.g., plated or layered metals) that is known in the art for making conduits. Other materials which may be suitable for the conduit are polymers, such as polyethylene or polyvinyl chloride. Yet other materials may include woven and non-woven fabrics or membranes. In some embodiments, the conduit may be a composite material of multiple materials, including metals, polymer, or other materials. Depending on the material used, as well as other characteristics, such as radial thickness and cross-sectional shape, a conduit may be rigid or flexible.

Sheath

With reference to FIG. 1, the sheath 120 surrounds the conduit 110 about the perimeter of the conduit and extends along at least a portion of the length of the conduit. In some embodiments, the sheath 120 would be partially or substantially impervious to the fluid for at least an amount of time about equal to the time between visual inspections. In various embodiments of the instant invention, the sheath 120 may be used for containing fluid leaking from the conduit 110, to divert the leaked fluid from the leak location to, for example, a safer location where cleanup may be easier, and/or to facilitate leak detection.

In some embodiments, the sheath may be formed by extrusion or co-extrusion of one or more materials through a die or other extrusion device. Optionally, the sheath may be extruded contemporaneously as a conduit is passed through the die or extrusion device. The sheath may also be formed independently by extrusion or other methods and slid over, or otherwise applied to, a conduit. The application of the sheath may occur at a point of manufacture and thus prepared ahead of the installation and/or use of the device, or alternatively the sheath may be applied at the point of installation and/or use (i.e., on-site, where the device is intended to be used).

In some embodiments, the shape of the sheath is substantially similar to that of the conduit, but in other embodiments the shape is not limited in this way. The interior and/or exterior of the sheath may comprise one or more different features such as grooves, extensions, baffles, walls, threads, and/or a combination thereof, as well as any other features or elements that a person skilled in the art would know could be on or associated with the interior or exterior of the sheath.

According to embodiments, the sheath may be formed from a thermoplastic compound, such as those using polyvinyl chloride compounds or polyethylene-based polymers. Sheathing material may also incorporate additives which may provide functional characteristics, such as: corrosion resistance to acidic or alkaline attack, weatherability, flexibility, UV-resistance and other such characteristics which may be desired or required. Commercially available compounds such as those used for jacketing underground feeder (UF) electrical cable may suitably be used. Such material may advantageously be manufactured, for example, to meet the Underwriters' Laboratory UL-62 Standard for Flexible Cord and Fixture Wire, or other relevant standards. Such material is advantageously flame-retardant, moisture-, fungus-, and corrosion-resistant, and suitable for direct burial in the earth or use which may bring the device into direct contact with any number of construction materials. Commercially available polyvinyl chloride compounds useful as jacketing include the resin Geon 8801 available from The Geon Company, P.O. Box 122, Moore & Walker Roads, Avon Lake, Ohio and the resin GA-7056-FR available from The Gitto/Global Corporation, 140 Leominster-Shirley Road, Glanna Park, P.O. Box 518, Lunenberg, Mass. The sheath may also be made from a number of thermoplastic materials which are available commercially, such as polyethylene, including, but not limited to, HDPE, LDPE and LLDPE. In one embodiment, the sheath may be made from NOVAPOL™ polyethylene extrusion resin PP-0118-F, which is an LLDPE. A further material used in some embodiments, the GA-7056-FR compound is formulated from a relatively high molecular weight polyvinyl chloride resin whose relative viscosity lies in the range of between about 2 and 3, for example lying in the range of about 2.2 to 2.3.

In some embodiments, the sheath may be extruded from a thermoplastically processable plasticized polyvinyl chloride compound, polyethylene, or other polymer containing an ultraviolet (UV) stabilizer. The UV stabilizer benzophenone can be used in some embodiments using PVC or other compatible materials. It is presently understood that the addition of a UV stabilizer may enhance the durability of the sheath for outdoor use for certain materials that would be compatible therewith, including but not limited to PVC. Furthermore, it may be desired to add a fungal inhibitor to provide enhanced fungal and microbial resistance to the sheath in soil conditions where elevated temperature and humidity conditions might accelerate fungal or microbial attack, for materials compatible therewith, including PVC. An exemplary fungal inhibitor which may be used in some exemplary embodiments is bis, 2-3 oxy bis pharisne. In some embodiments, the sheath may be extruded from the compound GA-7056-FR blended with a UV inhibitor in the amount of about 0.444 wt. % of total formula weight, available from The Gitto/Global Corporation mentioned above. The properties of the GA-7056-FR are understood not to be disadvantageously affected by the addition of a stabilizer or inhibitor.

In some embodiments, the entire sheath may be comprised substantially entirely of a transparent material, including materials that are clear, semi-transparent, semi-clear, translucent, or otherwise permit a visual determination of whether the fluid intended to be conveyed by the fluid transfer device has leaked out of the conduit and into the sheath. In other embodiments, the sheath may have one or more clear strips along its length, one or more clear discrete strips around the perimeter of the device or sheath (i.e., rings in the sheath), or one or more discrete clear locations or windows. In an alternative embodiment, similar structures on the sheath may comprise elements or features that use different means to create a visual identifier, including a leak detection element for which a change in visual characteristics can be detected at the leak detection portions.

In some embodiments, the sheath comprises an identification portion. The identification portion may be used to provide a recognizable colour to a sheath that is otherwise clear or non-standard colour. The recognizable colour may be required when colour coding is required by local regulations or convention to identify a fluid transfer device as being used for a particular fluid, purpose, or condition. In some embodiments, the identification portion provides a means to label or otherwise put an indication on the fluid transfer device, including but not limited to sizing information, connection information, compatibility with other materials and/or ambient conditions, and/or a trade name or mark.

In some embodiments, the sheath may be rigid or flexible. In some embodiments, the sheath is generally of equal or greater flexibility than the conduit, yet in other embodiments, the sheath may be less flexible than the conduit.

Visual Indications

The sheath comprises one or more leak detection portions which are configured to provide a visual indication of the presence of fluid in a space, region or interface between the conduit and the sheath. The presence of fluid in this space is typically indicative of a leak in the conduit, or other cause of fluid transfer from inside the conduit. In general, the visual indication may be a visible change that occurs when fluid that has leaked from the conduit reaches a leak detection portion. It may include an opening in the sheath at a pre-determined location (i.e., at the end of a length of conduit, or at a location on the device that is accessible), a clear or partially clear portion of the material of the sheath (including any degree of transparency or translucency in the sheath through which the presence of a fluid can be visually detected), a portion of the sheath that is configured to have some visual characteristic change upon contact with leaked fluid, or some additional device or apparatus that provides a visible sign such as a light, blinking light, text, flag, or other indicator, when contact with leaked fluid is made.

A visual indication may, in some embodiments, be facilitated by a leak detection element, in which a change is induced upon contact with leaked fluid. The change comprises a direct visual indication at a leak detection portion by, for example, being visible through a clear portion. In some embodiments, the leak detection element may lead to an indirect visible indication at the leak detection portion.

A leak detection portion or element may comprise fluid accumulation elements such as sponges, capillaries, reservoirs, valve traps, or the like, indication elements such as chemicals impregnated into or coating the sheath, or the like or a combination thereof.

Methods of Manufacture

Figure 4:
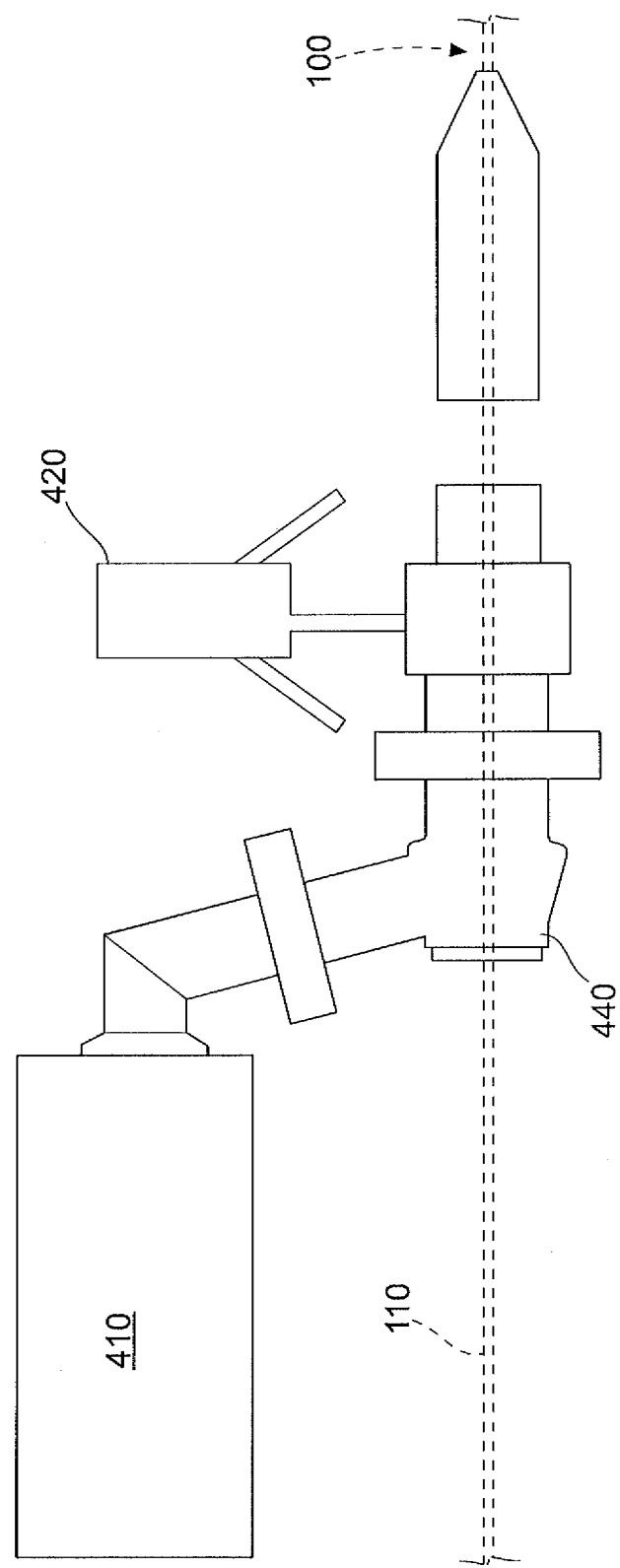
FIG. 4 depicts an exemplary system for manufacturing a fluid transfer device in accordance with an embodiment of the instant invention.

FIG. 4 illustrates a system for manufacturing a fluid transfer device according to embodiments of the instant invention. This system provides a means for making a fluid transfer device wherein the sheath material is applied over the inner tube using a co-extrusion process. An off-set extrusion device 440 facilitates the introduction of the conduit 110 through a series of dies and pins, as well as inlets for extruding material from a primary extruder 410 and a co-extruder 420. The configuration of the sheath material and thickness is controlled by the design of the pins and dies in the extrusion device 440, as well as by other characteristics of sheath material through the dies (e.g., viscosity, volumetric flow-rate). Some characteristics of the sheath material relative to the movement of the conduit through the die, such as for example, volumetric flow-rate, may affect the configuration and thickness of the resulting sheath. The primary extruder 410 provides extrusion material for forming a first sheath material and the co-extruder 420 provides extrusion material for forming a second sheath material. In some embodiments, the first sheath material may comprise a material that hardens as a clear material, thus providing the leak detection portion of the sheath. The second sheath material may, for example, be used to form an identification or striping portion of the sheath. In some embodiments, the second sheath material may form a clear stripe as the leak detection portion.

Prior to exiting the final dies in the extrusion device 440, the introduction of a bore in the extrusion device 440 permit the ability to add one or more co-extruders (such as the co-extruder 800 shown in FIG. 8) and introduce additional extrusion material, for example forming an identification portion, onto the sheath covering the conduit. In some embodiments, both co-extruders use polymer products that are similar with exception of the colourant or some other additive added to the second extrusion material. In some embodiments, similar heat profiles in the materials from the primary extruder 410 and the co-extruder 420 facilitates the introduction of the second sheath material properly blending with the base tube such that there are no surface laminations. In some embodiments, the feed control of the material by the co-extruder will be such that the layer of second sheath material will not exceed 50% of the overall thickness of the sheath. This will ensure the integrity of the sheath can be maintained.

Figure 5B:
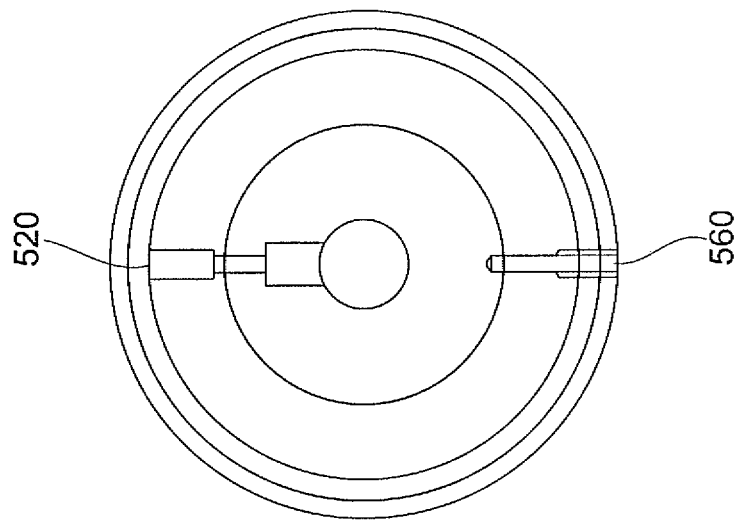
FIG. 5A depicts cross-sectional side view and FIG. 5B depicts a front view of an apparatus for manufacturing a fluid transfer device in accordance with an embodiment of the instant invention.
Figure 5A:
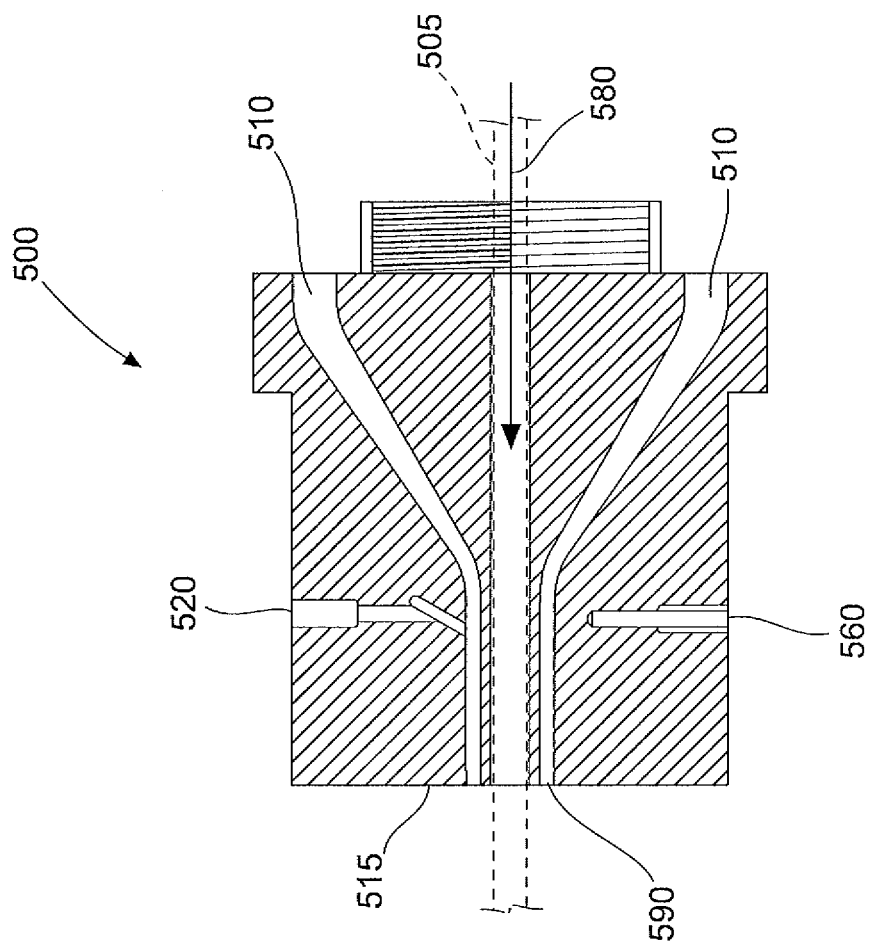

In one embodiment, a method of making the fluid transfer device can be understood with reference to FIGS. 5A and 5B, which illustrates different cross sections of an exemplary apparatus for making a fluid transfer device having a conduit passing therethrough while undergoing sheath application. A length of copper tube 505, for example, having a bore therethrough, and which may be plugged and is moved in a direction shown by arrow 580. The apparatus may optionally comprise a heater having heating elements of suitable heat capacity to bring the tube to a desired temperature, between, for example, about 120° F. and 135° F. The tube 505, if irregular in shape, may be straightened before or after the heating step by means of a straightening device (not shown) such as a device using oppositely apposed spaced-apart rollers. The tube 505, while still heated, is moved by idler rollers through an extrusion device 500 wherein through first inlets 510 a heated layer of melted thermoplastic polyvinyl chloride or polyethylene (or other suitable polymer) resin containing an ultraviolet stabilizer, for example, is extruded coextensively about the tube 505. The sheath layer is extruded through sizing dies 590 in such a manner to provide a sheath layer having a desired annular wall thereon which may be substantially uniform in radial thickness around its circumference, or may have varying thickness (for example, in order to apply a secondary extruding material via a second material inlet 520). Alternatively, the extruded sheath may comprise of one or more grooves, extensions or other features of substantially constant cross-section capable of being manufactured by extrusion through a die, as would be understood by a person skilled in the art. The fluid transfer device 515 thus formed is then sufficiently cooled by suitable means, such as a spray from a water bath, so that the sheath hardens and becomes firmly coated around the copper tube 505. There is provided an instrument bore 560 that extend to or near the extrusion material passageway that permits the use of instruments to measure various characteristics of the extrusion material and/or conduit, including temperature, flow rate, viscosity, etc.

Uses

Some embodiments of the instant invention comprise the use of a fluid transfer device having leak detection portions for transferring fluid. Other embodiments are for the use of the device in a leak inspection regime to ensure fluid transfer takes place in a safe and cost-effective manner. One or more of such uses may be for the transfer of oil, including heating oil, water and/or steam, coolants or refrigerants, gas, including natural gas, and/or other fluid capable of being transferred along a conduit.

Other embodiments of the invention may be suitable for use in an environment where the device is susceptible to damage or deterioration. These environments may include the presence of corrosive or otherwise damaging materials, which over time could affect the integrity of the conduit and its ability to transfer fluid without leakage, such as for example, concrete, soil, salt water, or the like. The fluid transfer device may also be used to convey fluids having various characteristics (such as pH, temperature, pressure, or other conditions known to a person skilled in the art, or changes thereto), which are capable of causing damage or deterioration to the conduit over time. Other uses of the invention may include circumstances with portions of the device may not be accessible since they may be, for example, underground or behind walls or other inaccessible objects. One embodiment of the instant invention may facilitate the detection of leaks, and inspection of fluid transfer devices, when the device is used in environments in which leaks may occur and in which portions of the fluid transfer device are inaccessible.

In some embodiments, a fluid transfer device is configured to contain leaks. The sheath may be adapted to contain fluid that leaked from the conduit in order to, for example, prevent contamination to the area surrounding the location of the leak, maintain fluid flow or pressure within the conduit, or prevent contamination of the fluid within the conduit. In some embodiments, the sheath may comprise one or more reservoirs or resilient expandable portions which are configured to contain a predetermined amount of fluid optionally within a predetermined pressure range.

In other embodiments, the instant invention comprises use of the fluid transfer device for diverting leaks. The sheath may be adapted to divert fluid leaked from the leak location on the conduit to a different location where, for example, clean up is more manageable, area contamination may be less dangerous or have less or different risks, and/or leaks can be detected more easily.

Further, the fluid transfer device is suitable for applications such as refrigeration lines carrying chemicals such as Freon, or a replacement refrigerant, air conditioning lines, and cold and hot water lines. In some embodiments, the sheath may contribute a thermal insulation property to the conduit and/or the fluid therein. The fluid transfer device can therefore suitable where condensation may otherwise occur or where an unprotected tube carrying hot fluids may cause burning if touched, or would freeze due to ambient conditions.

In some embodiments, the fluid transfer device is for transferring heating oil. Heating oil, or oil heat, also known in the United States as No. 2 heating oil, is a low viscosity, flammable liquid petroleum product used to fuel building furnaces or boilers. In the U.S., it must conform to ASTM standard D396. Diesel, bio-fuels, bio-diesels, and kerosene are other examples of fluids that may be transferred by the fluid transfer device.

EXAMPLES

The invention will now be described with reference to specific examples. It will be understood that the following examples are intended to describe embodiments of the invention and are not intended to limit the invention in any way.

Example 1

Method of Manufacture

With reference to FIGS. 4, 8 and 9, there is provided an extrusion process wherein a plastic feed material (such as granulated polyethylene or polyvinyl chloride resin) is fed into a first heated inlet extruder cavity, feeder or cylinder 820, 910, such as those shown in FIG. 8 or 9. Typically, the raw plastic is in a bead form and is often mixed with additives and/or colourants before the extrusion process begins. In this embodiment, there is no colourant additive for the primary sheath material and initial extrusion. Colourant additive is introduced by the second co-extrusion device 420 as striping applied to the sheath in a controlled portion of the extruding device 440 prior to exiting the dies. Once inside the plastic extrusion machine 900, the plastic beads or pellets move through an opening in the first extruder cavity 910 towards a screw mechanism 940 in a second extruder cavity 920. The screw rotates, forcing the plastic material to advance through the extruder cavity 920.

Inside the extruder cavity 920, the temperature may be 400° F. (200° C.) or higher depending on the type of polymer and desired polymer and sheath characteristics (e.g., viscosity, final sheath thickness). The extruder cavity temperature should be substantially equal to or higher than the melt temperature of the plastic material. In most cases there will be three to four heater bands 930 in the extruder cavity 920 to gradually increase the heat inside the cavity as this reduces the potential for overheating. Friction and pressure within the cavity of the extruder serve to produce extra heat and may require external cooling fans, heat exchangers, or the like (not shown) to assist in the control of the heat required.

When the molten plastic reaches the front of the extruder cavity 920, it moves away from the screw 940 and passes through a series of screens (not shown) designed to filter out contaminants from the plastic. The molten plastic subsequently moves into a die 950 from which it is transported via a feeding line 960 for application to the conduit.

With reference to FIG. 9, there is disclosed an extruder used for making a fluid transfer device. Extruder 900 comprises an inlet feeder 910 for receiving polymer pellets. The polymer pellets are fed into the screw-type drive that causes a pre-determined amount of polymer material to be fed towards the extruder device. The screw-type drive comprises screws 940, which cause the pellets and/or molten polymer material to move at a desired volumetric flow-rate. The extruder 900 also comprises heating bands 930 that are configured to provide sufficient thermal energy at a desired temperature and rate to maintain the polymer at a desired temperature and viscosity. The molten polymer is forced through a pre-extruding die 950, which may for example filter the molten polymer and/or control the feed rate, and then into the extruder device feeding line 960 at the desired temperature and flowrate for subsequent application to the conduit during fabrication of the fluid transfer device.

Although there are several polymer products that may be acceptable for this application, LLDPE (liner low-density polyethylene) may be a particularly suitable polymer because of high flexibility and corrosion resistance. One such product would be Novapol™ PP-0118-F as supplied by Nova Chemicals™ in a barefoot resin. This extrusion resin has been chosen as it is well accepted for applications that include piping for potable water and underground sprinkler systems.

To the base tube extrusion resin additives of UV stabilisers, anti oxidants and metal deactivators are generally added in a ratio of 2-3% each or in total, depending on requirements of the site and/or use of the fluid transfer device. For the coloured striping resin as may be applied by the co-extruder 420 the same resin ratio and additives can be used with the exception of colour added to the mixture. There are no adhesives applied to either resin or on the base copper for bonding, as the sheath is to be partially removed in one or more locations to permit the application of fittings. In addition, this lack of bonding may permit fluid movement from the leak location to a leak detection portion in this example.

When the polymer that is supplied as a clear product is introduced to the polymer of the striped identification area it is desired that the temperature variance is adequately low (for example, both in the 420° F. range) to ensure there is proper blending of the two materials. Failure to achieve this in the process could result in lamination concerns between the two areas of polymers when introduced or exiting the dies. To ensure there is a certain level of integrity in the base sheath regardless of the striping material it will be manufactured at a thickness less than or equal to ½ of the standard wall thickness of the sheath (generally 0.025") or 0.013" clear and a thickness of 0.012" minimum for the stripe for a total thickness of 0.025" at the thinnest point of the sheath. If an inner grooved configuration is used the overall wall thickness of the polymer can be in the range of 0.045".

In this example, approximately 2" prior to exiting the final dies in the extrusion device 440, the introduction of a bore in the tooling permits (see fluid inlet 220 in FIG. 2, for example) the ability to add a smaller co-extruder 800 and introduce striping onto the primary tube, for example by connecting extruder output 810 to inlet 220. The polymer products used on both extruding devices are similar, with the exception, in this example, of the addition of colourant to the extrusion material associated with the co-extruder 800. As previously mentioned, it is desired to maintain similar heat profiles with both extruding devices to ensure that the introduction of the coloured extrusion material blends with the base sheath in order to avoid surface laminations.

Figure 10:
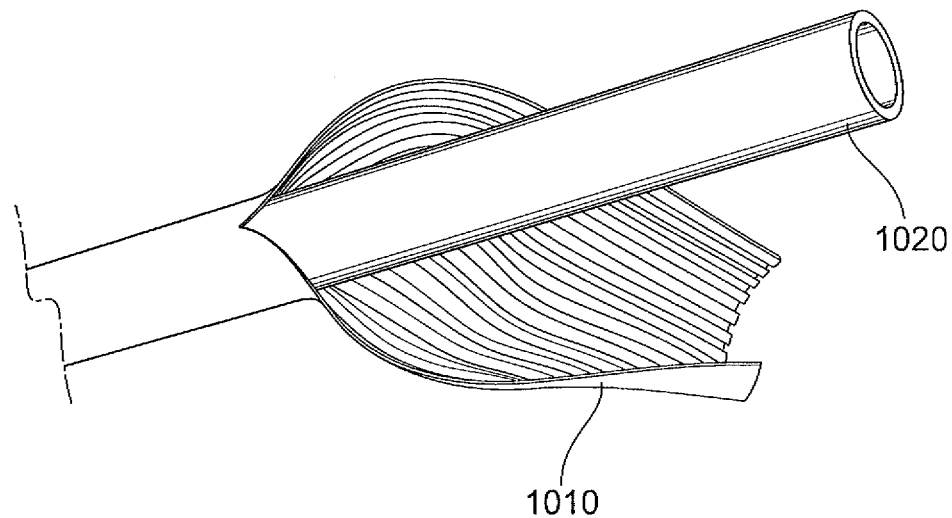
FIG. 10 depicts a fluid transfer device in accordance with an embodiment of the instant invention.

Once the fluid transfer device exits the last dies in the tooling it can be substantially immediately submersed into a clean water bath of cool water in functional element 440 to solidify the outer coating. Upon exiting the cooling bath air blow rings (not shown) aid in the removing of excess water prior to the printing of product with description, specification information and lot numbers within the coloured area of the sheath, for example. FIG. 10 illustrates a fluid transfer device that may be made in accordance with this or other embodiments comprising a conduit 1010 and a sheath 1020, as well as an exemplary use for the fluid transfer device for leak detection.

Figure 11:
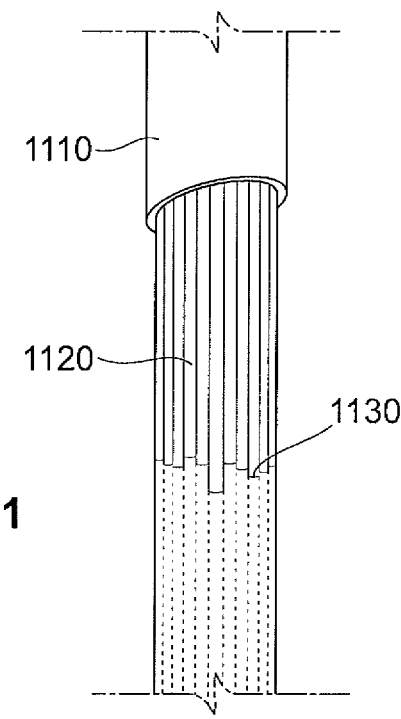
FIG. 11 depicts fluid transfer devices, and a use thereof, in accordance with an embodiment of the instant invention.

FIG. 11 illustrates a fluid transfer device in accordance with embodiments of the present invention. The fluid transfer device comprises inner grooves 1120, represented by broken lines, which may be configured for accommodating fluid which may have leaked outside of the conduit. In some embodiments, tape or shrink tube 1110 may be used to seal off an end of the fluid transfer device for containment purposes. As illustrated, fluid 1130 within the inner grooves 1120 may be visually detected, for example through use of a transparent sheath.

The fluid transfer device is subsequently wound on a mandrel either manually or through an automated process and traditionally supplied in the industry in standard coil lengths of 50', 60' or 100'. There may be instances where the fluid transfer device is supplied in a rigid straight length in applications where it may not be as important to eliminate joints. With the continuous extrusion process set up and large parent reels of conduit to work with, there are instances where larger reel pack type coils of the fluid transfer device typically in the 250' range could be supplied.

On site the fluid transfer device may be joined to other fluid transfer devices, or elements thereof, using an approved fitting method for the application and to meet local code requirements. Special care should be taken when unrolling the product supplied in coils to ensure it is not kinked or the inner tube is not fractured. In many cases, below ground joints or fittings are typically not permitted regardless of the tubing contents, so a continuous length may be desired. If the conduit is damaged or fractured during the installation process the clear section of the sheath will provide an opportunity to visually inspect the fluid transfer device prior and during the testing period. The typical fitting method for Gas or Oil applications would be that of a standard flare type fitting. The sheath may be removed slightly or peeled back to permit the flare nut to be placed of the base tube. Upon use of a flaring device, the copper tube may be flared at one end to permit it to be placed on the receiving fitting Example 2

Apparatus for Making Fluid Transfer Device

Figure 12:
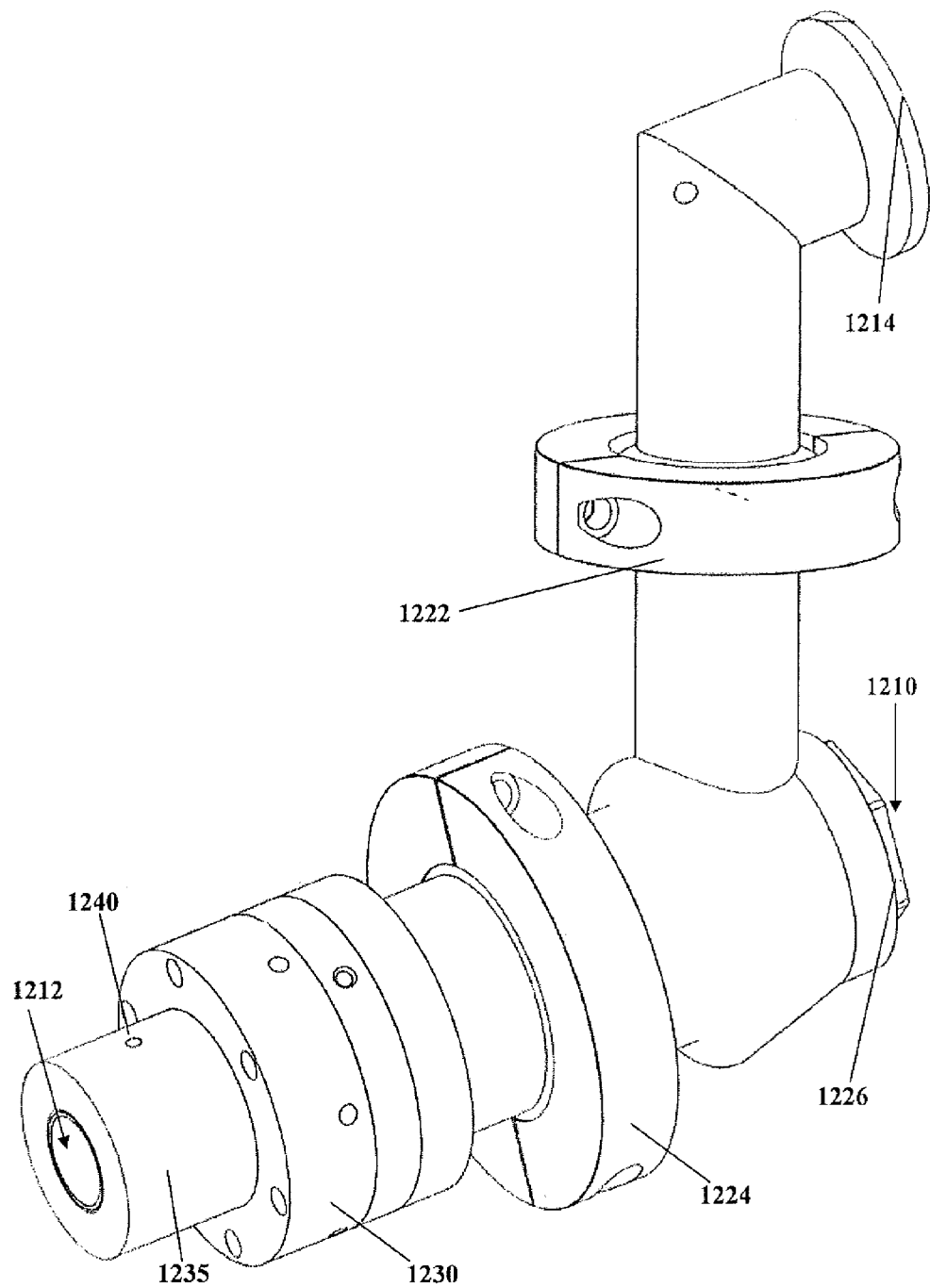
FIG. 12 depicts an exemplary apparatus for the manufacturing of a fluid transfer device in accordance with another embodiment of the instant invention.
Figure 13:
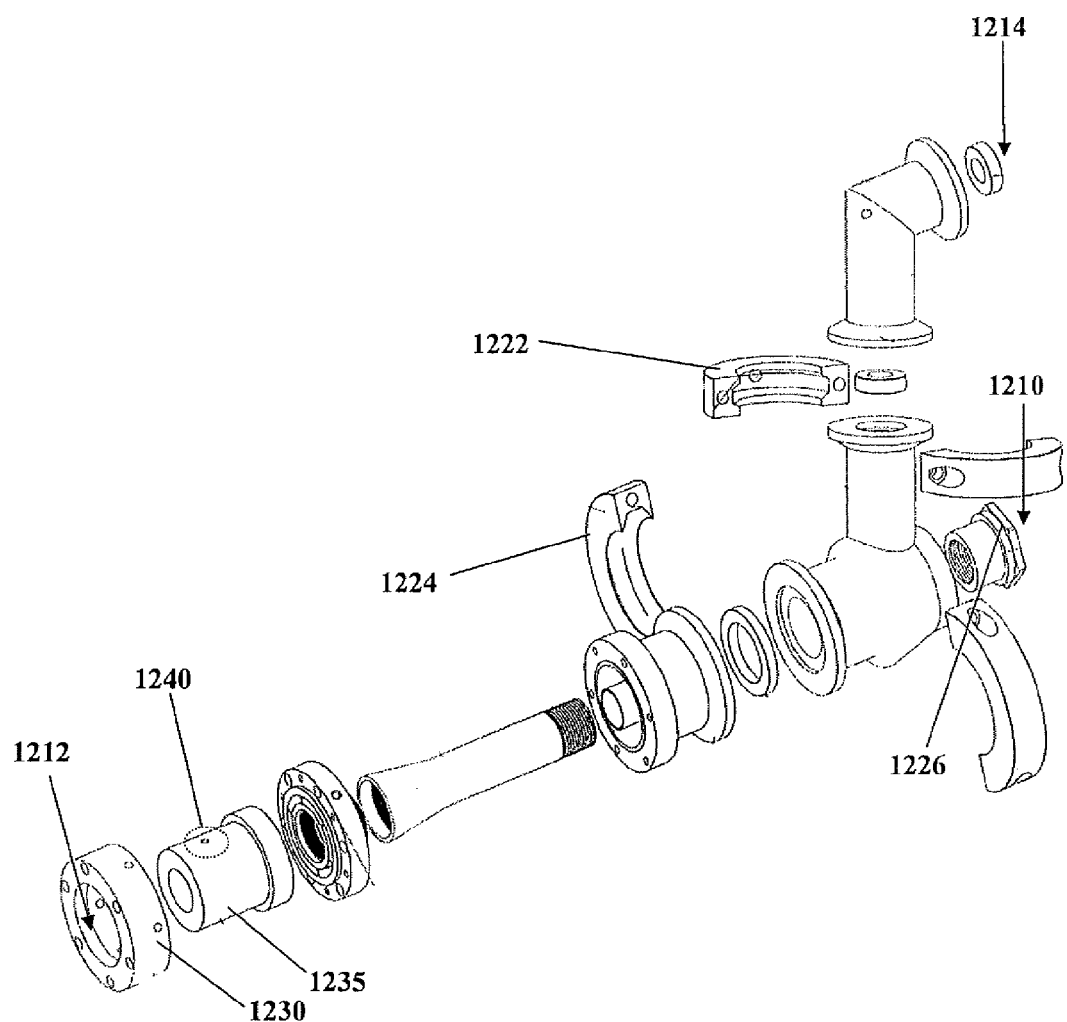
FIG. 13 depicts an exploded view of the apparatus of FIG. 12.
Figure 14:
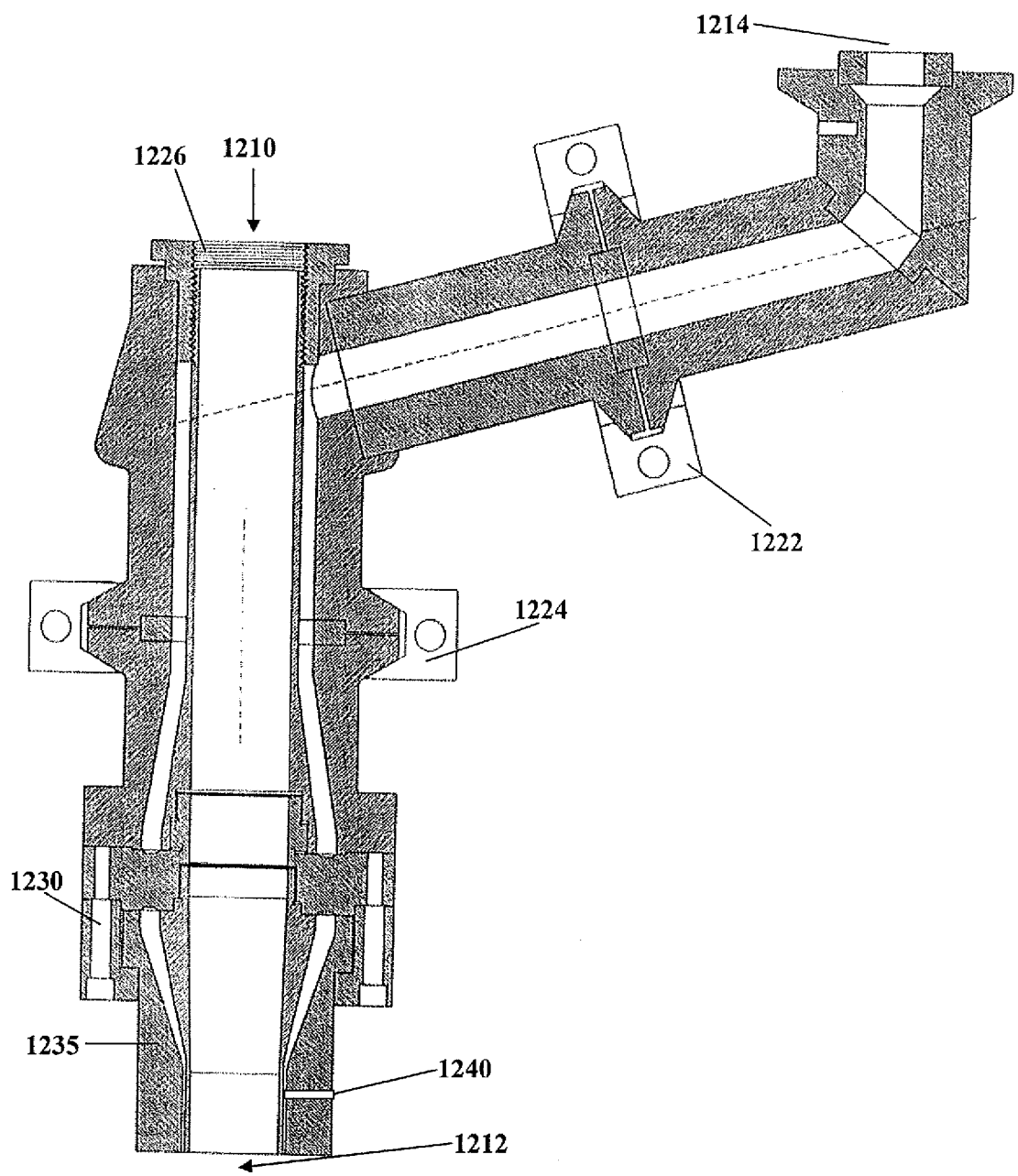
FIG. 14 depicts a cross sectional view of the apparatus of FIG. 12.

With reference to FIGS. 6 and 7, there is disclosed an apparatus for making a fluid transfer device. FIG. 6 shows a cross-sectional side view of the apparatus 600 and FIG. 7 shows a cross-sectional front view of the apparatus 600. The apparatus 600 according to this exemplary embodiment comprises a die 605 for receiving a conduit via the conduit receiving location 640 and one or more extruding materials via inlets 610, 660. The conduit passes through the apparatus at the conduit outlet 650 located substantially near extrusion outlets 620. The extrusion bores 615 extend from the extrusion inlets 610 to the extrusion outlets 620 and the co-extrusion inlets 660 provide for application of second extrusion materials to a fluid transfer device. Slot 690 provides a means for applying a strip of second extrusion material to the sheath. In some embodiments, a saw cut 680 provides for a means of machining slot 690 into the die. FIG. 7 depicts a cross-sectional front view of this exemplary embodiment of the apparatus for making a fluid transfer device 600. Attachment portion 710 at the rear of the apparatus provides for a means, such as a flange, for securing the apparatus to other tooling or apparatuses in a system for manufacturing a fluid transfer device, and may also proved reinforcement for providing the extrusion material inlets to be located towards the exterior surface of the apparatus and the main body 720 of the apparatus projects forward therefrom. Conduit outlet 650 and extrusion outlet 620 are shown, as is co-extrusion inlet 660 and the slot for adding the second sheath material 690. There is provided an instrument bore 670 that extend to or near the extrusion material passageway that permits the use of instruments (e.g., thermocouple, flowmeter, pressure meters, manometers, viscometer, etc.) to measure various characteristics of the extrusion material and/or conduit, including temperature, flow rate, pressure, viscosity, etc. FIGS. 12, 13 and 14 depict an exemplary embodiment of an apparatus which may comprise the apparatus of FIGS. 6 and 7.

Referring to FIGS. 12 to 14, the illustrated apparatus comprises a conduit entry port 1210, which accepts unsheathed conduit, a finished product exit port 1212, through which the conduit with an extruded sheath exits, and an extrusion material entry port 1214 which accepts extrusion material from an extruder, the extrusion material plastically flowing into the apparatus. The apparatus further comprises clamp rings 1222, 1224, which facilitate assembly and disassembly of the apparatus, for example for cleaning of the inner parts. The apparatus further comprises a large nut 1226 which is configured for attaching the apparatus main body to inner portions thereof. The apparatus further comprises a retainer ring 1230 which is configured for holding and adjusting the extrusion pin and die 1235, thereby facilitating maintaining a uniform sheath thickness of the finished product. The extrusion pin and die 1235 is configured to accommodate a predetermined size of conduit, and may be interchangeable to accommodate various sizes. The extrusion pin and die 1235 further comprises a co-extrusion entry port 1240 for accepting co-extrusion material, for example used for striping of the finished product or otherwise providing an identification portion thereof.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention as defined in the appended claims.

The embodiments of the invention for which an exclusive property or privilege is claimed are defined as follows:

1. A fluid transfer device comprising:
    a) a conduit configured to transfer a fluid, said conduit having a perimeter and a length; and
    b) a sheath surrounding the perimeter of the conduit and extending along at least part of the length of the conduit, the sheath including:
        one or more identifying portions, the identifying portions being configured to identify the nature and purpose of the fluid transfer device and comprising at least one colored strip wherein the color identifies the fluid type which the conduit is configured to transfer; and
        one or more leak detection portions, each leak detection portion configured to provide an indication of fluid leaking from the conduit and comprising a strip of clear, semi-clear, transparent or translucent material.

2. The fluid transfer device of claim 1, wherein one or both of the conduit and the sheath are manufactured at least in part from one or more of the following materials: copper, steel, metal, metal alloy, fabric, and polymer.

3. The fluid transfer device of claim 1, wherein the fluid is heating oil, diesel, bio-fuel, or bio-diesel.

4. The fluid transfer device of claim 1, wherein an inner surface of the sheath comprises one or more features selected from the group comprising: grooves, bumps, protrusions, channels, and a smooth surface.

5. The fluid transfer device of claim 1, wherein the leak detection portion comprises a reactive material configured to change color, luminescence, or other visual characteristic upon contact with the fluid.

6. The fluid transfer device of claim 1, wherein the leak detection portion is configured to facilitate inspection of a leak indication element located along at least a portion of the fluid transfer device between the conduit and the sheath, the leak indication element indicative of fluid leaking from at least a predetermined portion of the conduit.

7. The fluid transfer device of claim 6, wherein the leak indication element comprises one or more of: a strip, a sticker, a powder, a coating, and a covering, said leak detection element configured to change at least one visual characteristic upon contact with the fluid.

8. The fluid transfer device of claim 1, wherein the sheath is unsealed at one or more ends of the fluid transfer device.

9. Use of the fluid transfer device of claim 1 for leak detection, leak containment, leak diversion, or a combination thereof.

10. The fluid transfer device of claim 1, wherein an inner surface of the sheath comprises one or more features selected from the group comprising grooves, bumps, protrusions and channels.

11. The fluid transfer device of claim 10, wherein the conduit is manufactured at least in part from a material selected from the group consisting of copper, steel, metal, and metal alloy.

12. A fluid transfer device comprising:
a) a conduit configured to transfer a fluid, said conduit having a perimeter and a length;
b) a sheath surrounding the perimeter of the conduit and extending along at least part of the length of the conduit, the sheath including one or more leak detection portions, each leak detection portion configured to provide an indication of fluid leaking from the conduit; and
c) a channel disposed between the conduit and the sheath, the channel being configured to permit fluid movement therein along the length of the conduit, wherein the channel is formed on an outer surface of the conduit by grooves, bumps, or protrusions disposed thereon.

13. A fluid transfer device comprising:
a) a conduit configured to transfer a fluid, said conduit having a perimeter and a length;
b) a sheath surrounding the perimeter of the conduit and extending along at least part of the length of the conduit, the sheath including one or more leak detection portions, each leak detection portion configured to provide an indication of fluid leaking from the conduit and
c) a channel disposed between the conduit and the sheath, the channel being configured to permit fluid movement therein along the length of the conduit, wherein the channel is formed by beads disposed between the sheath and the conduit.

* * * * *